United States Patent [19]

Guillaumon et al.

[11] Patent Number: 4,920,163

[45] Date of Patent: Apr. 24, 1990

[54] IONIZABLE PAINTS FOR USE ESPECIALLY AS ANTI-LIGHTNING PAINTS

[75] Inventors: Jean-Claude Guillaumon, Ayguesvives; Louis J. C. Blet, Corranssac, both of France

[73] Assignee: Centre Nationale d'Etudes Spatiales, France

[21] Appl. No.: 222,750

[22] Filed: Jul. 22, 1988

[30] Foreign Application Priority Data

Jul. 24, 1987 [FR] France ................................ 87 10536

[51] Int. Cl.$^5$ ............................................. C08K 3/24
[52] U.S. Cl. ..................................... 523/440; 523/513; 524/394; 524/400; 252/518; 252/521
[58] Field of Search ................ 524/394, 400; 523/440, 523/513; 252/518, 521

[56] References Cited

U.S. PATENT DOCUMENTS

| | | | |
|---|---|---|---|
| 3,342,765 | 9/1967 | Oosterhof et al. | 524/394 |
| 4,102,843 | 7/1978 | Sperry et al. | 524/394 |
| 4,476,263 | 10/1984 | Owens | 524/394 |
| 4,529,538 | 7/1985 | Kim | 252/500 |
| 4,546,140 | 10/1985 | Shih | 524/400 |

*Primary Examiner*—Lewis T. Jacobs
*Attorney, Agent, or Firm*—Watson, Cole, Grindle & Watson

[57] ABSTRACT

A paint for use on surfaces subject to lightning strikes includes a film-forming binder and a pigment, the pigment comprising at least one alkali metal salt or alkaline earth metal salt with a low first ionization potential, of a mono- or polyfunctional organic acid, carbonic acid or a polymer having an acidic group, the pigment being present in an amount sufficient to render the paint ionizable under the action of a strong electric current.

18 Claims, No Drawings

IONIZABLE PAINTS FOR USE ESPECIALLY AS ANTI-LIGHTNING PAINTS

The invention relates to an ionizable paint which allows strong electric currents, such as those due to lightning, to diffuse, and to its application for the protection of launcher and aircraft components liable to be struck by lighting.

Dielectric materials (composites: epoxides/carbon fibers, epoxides/glass fibers, epoxides/aramid fibers, etc.), which are increasingly used in launchers or aircraft, do not permit the very strong currents of a lightning strike to drain. As such, these materials, together with any nearby electric cables can be partly or totally destroyed.

The currently known solutions for protection against lightning consist of wire meshing cemented to the surface of the dielectric materials or of conducting adhesive strips; a finishing paint is then applied over these.

These solutions have major shortcomings in that they are difficult to install and, also, are costly.

It would therefore be advantageous to have available a paint or coating composition acting as protection against lightning.

The Applicant has now discovered novel ionizable paints or coating compositions which allow the very strong currents due to a lightning strike to drain.

More particularly, the invention relates to a paint comprising a film-forming binder and a pigment in which the pigment comprises at least one alkali metal salt or alkaline earth metal salt with a first ionization potential between 3.89 and 6.2 volts, of a mono- or polyfunctional organic acid, carbonic acid or a polymer having an acidic group, this pigment being present in an amount sufficient to render the paint ionizable under the action of a strong electric current.

At the present time salts of cesium or barium are preferred for use as pigment.

The pigments used in the invention have a decomposition temperature of the order of about 200° to 600° C. and they liberate ions which allow electric currents due to lightning to diffuse on the surface of the paint, thus ensuring that the underlying dielectric materials receive protection.

For example, oxalic acid, tartaric acid, citric acid, malonic acid, maleic acid, etc., may be used as organic acids.

Any polymers with a carboxylic and/or sulfonyl group may be used as polymers having an acid group. Ion exchange resins have been found to be particularly suitable. The paints according to the invention may be applied to the substrates to be painted in a single or in several coats.

Any binder suitable for the formulation of paints may be used. Polyurethanes, epoxy resins, acrylic resins, glycerophthalic resins, silicone resins, etc., may be cited by way of examples without any limitation being implied.

A person skilled in the art will be able to find a large number of suitable binders in the copious literature published on this subject. In addition to the ionizable pigments according to the invention and to the binder, the paints according to the invention may comprise conventional white or colored pigments, for example titanium dioxide, zinc oxide, tin oxide, zinc orthotitanate, iron oxide, chromium oxide, etc.

The ratio of ionizable pigment to the total weight of pigments may be between 20 and 100% by weight.

On the other hand, the weight ratio of total pigments/binder is usually in the range from 0.7 to 4, although these values are not very critical.

The paint according to the invention may also contain one or more solvents, such as, for example, aromatic hydrocarbons, aliphatic hydrocarbons, ketones, esters, glycol ethers, etc. The paint may also be in the form of an aqueous dispersion of emulsion. The proportion of solvent is usually in the range from 0 to 60% by weight, based on the total weight of the paint.

The paints according to the invention may of course also comprise any desired additives commonly used in the formulation of paints.

The coats of paint according to the invention may be applied to a substrate by a spray gun, by brushing or by any other known technique.

The paints according to the invention may be applied to any type of substrates, such as metals or composite materials. Suitable substrates which may be cited are epoxide/glass fiber composites, epoxide/carbon fiber composites, epoxide/aramid fiber composites and metal alloys. If desired or necessary, a coat of phosphating primer or any other coat of primer or preparation may be applied prior to applying the paints according to the invention.

In addition to their use on launchers or aircraft as lightning protection, the paints according to the invention are suitable for use in other industries or other fields, for example in electronics.

The examples below are given to illustrate the invention, without any limitation being implied.

EXAMPLE 1

An anti-lightning paint of a thickness between 15 and 100 micrometers after drying is obtained by applying to a substrate a paint prepared in the following manner:

18 g of ethylene glycol acetate and 52 g of ethyl acetate are added to 102.8 g of the polyurethane binder DESMOPHEN 651 (ex BAYER) in a vertical disperser; 62 g of cesium acid tartrate, 62 g of titanium dioxide and 0.6 g of diatomaceous earth are added to the resulting solution and dispersing is continued for 10 minutes. The diatomaceous earth is an antisettling agent which prevents the formation of agglomerates of the pigments while the paint is stored.

The resultant paste is ground in a RED DEVIL ball mill for 30 minutes. The resultant composition is separated from the balls by screening. 82.25 g of the crosslinking agent DESMODUR N75 are incorporated into the resultant composition immediately prior to its application.

The pigment/binder (P/B) ratio is 1.

Tests against lightning of this paint applied to epoxy/glass fiber composite have shown a good performance of the paint.

These tests have been carried out in accordance with the American Military Specification M/L STD1275 A and in accordance with the recommendation of the American Civil Aviation AC 2053 A.

For these tests, the lightning consisted of two components:

the component A with the following characteristics: intensity 200 kA with a flux of $2 \times 10^6$ $A^2/s$;

the component C* had the following characteristics: current of 20 coulombs with a maximum intensity of 400 A.

The method of preparation of the paint compositions given in the examples below is carried out in a manner similar to that described above, except that the ingredients employed have been modified as indicated.

EXAMPLE 2

An anti-lightning paint of a thickness between 15 and 100 micrometers after drying is obtained by applying to a substrate a paint of the following composition:
Polyurethane binder DESMOPHEN 651 (102.8 g) and crosslinking agent DESMODUR N75 (82.25 g) (BAYER products);
Pigment: a mixture of barium oxalate (62 g), titanium dioxide (62 g) and diatomaceous earth (0.7 g);
Solvents: a mixture of acetates from example 1.
The P/B ratio is 1.

Tests against lightning of this paint applied to epoxy/glass fiber composite have shown a good performance of the paint.

EXAMPLE 3

An anti-lightning paint of a thickness between 15 and 100 micrometers after drying is obtained by applying to a substrate a paint of the following composition:
Polyurethane binder DESMOPHEN 651 (102.8 g) and crosslinking agent DESMODUR N75 (82.25 g) (BAYER products);
Pigment: DOWEX W50 x 8 (ion exchange resin) treated with cesium nitrate (44 g), tin oxide (80 g) and diatomaceous earth (0.6 g).
The P/B ratio is 1.

Tests against lightning of this paint applied to epoxy/glass fiber composite have shown a good performance of the paint.

EXAMPLE 4

An anti-lightning paint of a thickness between 15 and 100 micrometers after drying is obtained by applying to a substrate a paint of the following composition:
Polyurethane binder DESMOPHEN 651 (102.8 g) and crosslinking agent DESMODUR N75 (82.25 g) (BAYER products);
Pigment DOWEX W50 x 8 (ion exchange resin) treated with barium hydroxide (44 g), tin oxide (80 g) and diatomaceous earth (0.6 g);
Solvents: mixture of acetates from example 1.
The P/B ratio is 1.

Tests against lightning of this paint applied to epoxy/glass fiber composite have shown a good performance of the paint.

EXAMPLE 5

An anti-lightning paint of a thickness between 15 and 100 micrometers after drying is obtained by applying to a substrate a paint of the following composition:
Polyurethane binder DESMOPHEN 651 (102.8 g) and crosslinking agent DESMODUR N75 (82.25 g) (BAYER products);
Pigment: mixture of cesium tartrate (31 g), barium oxalate (31 g), titanium dioxide (62 g) and diatomaceous earth (0.7 g);
Solvents: mixture of acetates from example 1.
The P/B ratio is 1.

Tests against lightning of this paint applied to epoxy/fiber glass composite have shown a good performance of the paint.

EXAMPLE 6

An anti-lightning paint of a thickness between 15 and 100 micrometers after drying is obtained by applying to a substrate a paint of the following composition:
Polyurethane binder DESMOPHEN 651 (102.8 g) and crosslinking agent DESMODUR N75 (82.25 g) (BAYER products);
Pigment: mixture of cesium tartrate (15.5 g), barium oxalate (46.5 g), titanium dioxide (62 g) and diatomaceous earth (0.7 g);
Solvents: mixture of acetates from example 1.
The P/B ratio is 1.

Tests against lightning of this paint applied to epoxy/glass fiber composite have shown a good performance of the paint.

EXAMPLE 7

An anti-lightning paint of a thickness between 15 and 100 micrometers after drying is obtained by applying to a substrate a paint of the following composition:
Polyurethane binder DESMOPHEN 651 (51.4 g) and crosslinking agent DESMODUR N75 (41.1 g) (BAYER products);
Pigment: mixture of cesium tartrate (62 g), titanium dioxide (62 g) and diatomaceous earth (0.7 g);
Solvents: mixture of acetates from example 1.
The P/B ratio is 2.

Tests against lightning of this paint applied to epoxy/glass fiber composite have shown a good performance of the paint.

EXAMPLE 8

An anti-lightning paint of a thickness between 15 and 100 micrometers after drying is obtained by applying to a substrate a paint of the following composition:
Polyurethane binder DESMOPHEN 651 (51.4 g) and crosslinking agent DESMODUR N75 (41.1 g) (BAYER products);
Pigment: mixture of barium oxalate (62 g), titanium dioxide (62 g) and diatomaceous earth (0.7 g);
Solvents: mixture of acetates from example 1.
The P/B ratio is 2.

Tests against lightning of this paint applied to epoxy/fiber glass composite have shown a good performance of the paint.

We claim:

1. An ionizable paint comprising a film-forming binder and an ionizable pigment comprising at least one of an alkali metal salt and an alkaline earth metal salt of a mono- or polyfunctional organic acid, said salt having a first ionization potential between 3.89 and 6.2 volts and said ionizable pigment comprising 20 to 100% by weight of total pigment in said paint.

2. A paint as claimed in claim 1, wherein said ionizable pigment is selected from the group consisting of a cesium salt and a barium salt.

3. A paint as claimed in claim 2, wherein said ionizable pigment is selected from the group consisting of cesium acid tartrate, barium oxalate and cesium tartrate.

4. A paint as claimed in claim 1, including a conventional pigment.

5. A paint as claimed in claim 1, including up to 60% by weight of solvent.

6. A substrate painted by a paint as defined in claim 1.

7. A substrate painted by a paint as defined in claim 2.

8. A substrate painted by a paint as defined in claim 3.

9. A substrate painted by a paint as defined in claim 4.

10. An ionizable paint comprising a film-forming binder and an ionizable pigment comprising at least one of an alkali metal salt and an alkali earth metal salt of a mono- or polyfunctional organic acid, said salt having a first ionization potential between 3.89 and 6.2 volts, the weight ratio of total pigments to binder being between 0.7 and 4.

11. A paint as claimed in claim 10, wherein said ionizable pigment is selected from the group consisting of a cesium salt and a barium salt.

12. A paint as claimed in claim 11, wherein said ionizable pigment is selected from the group consisting of cesium acid tartrate, barium oxalate and cesium tartrate.

13. A paint as claimed in claim 10, including a conventional pigment.

14. A paint as claimed in claim 10, including up to 60% by weight of solvent.

15. A substrate painted by a paint as defined in claim 10.

16. A substrate painted by a paint as defined in claim 11.

17. A substrate painted by a paint as defined in claim 12.

18. A substrate painted by a paint as defined in claim 13.

* * * * *